(12) United States Patent
Golle et al.

(10) Patent No.: US 7,792,291 B2
(45) Date of Patent: Sep. 7, 2010

(54) XOR ENCODED DOCUMENT FOR SECURE MESSAGE EXCHANGE

(75) Inventors: Philippe Golle, San Francisco, CA (US); Eric J Shrader, Belmont, CA (US); David Goldberg, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1246 days.

(21) Appl. No.: 11/276,058

(22) Filed: Feb. 10, 2006

(65) Prior Publication Data

US 2007/0223690 A1 Sep. 27, 2007

(51) Int. Cl.
*G09C 5/00* (2006.01)

(52) U.S. Cl. .......................... 380/54; 380/55; 380/56

(58) Field of Classification Search .................... 380/55, 380/54, 56, 28; 235/539, 441; 430/203; 705/64, 12
See application file for complete search history.

(56) References Cited

U.S. PATENT DOCUMENTS

| | | | | |
|---|---|---|---|---|
| 4,559,290 | A * | 12/1985 | Sawada et al. | 430/203 |
| 2003/0042306 | A1* | 3/2003 | Irwin et al. | 235/441 |
| 2003/0163431 | A1* | 8/2003 | Ginter et al. | 705/64 |
| 2004/0041018 | A1* | 3/2004 | Silverbrook et al. | 235/375 |
| 2005/0254106 | A9* | 11/2005 | Silverbrook et al. | 358/539 |

OTHER PUBLICATIONS

The CAPTCHA Project, "Telling Humans and Computers Apart (Automatically)", available on the Internet at http://www.captcha.net/ Jan. 30, 2006.
M. Chew, H.S. Baird, "BaffleText: A Human Interactive Proof," Proc., 10th IS&T/SPIE Document Recognition and Retrieval Conference, Santa Clara CA, Jan. 23-24, 2003.
A.L. Coates, H.S. Baird, R.J. Fateman, "Pessimal Print: A Reverse Turing Test," in Proc., 6th International Conference on Document Analysis and Recognition, Seattle, WA, USA, Sep. 10-13, pp. 1154-1158, 2001.
P. Golle, N. Ducheneaut, "Preventing Bots from Playing Online Games", ACM Computers in Entertainment, vol. 3, Jul. 2005.

* cited by examiner

*Primary Examiner*—Kimyen Vu
*Assistant Examiner*—Edward Zee
(74) *Attorney, Agent, or Firm*—Park, Vaughan & Fleming LLP

(57) ABSTRACT

An XOR (exclusive or) encoded document is disclosed for establishing a joint secret between two parties. Encoded on the document are one or more areas of XOR messages. Each area containing an XOR message hides from view on each side of the XOR encoded document a different message on either side of a transparent base layer. To uncover a message in an area containing an XOR message on one side of the transparent base layer, the message on the other side of the XOR encoded document is scratched off and rendered illegible.

15 Claims, 7 Drawing Sheets

FIG. 1
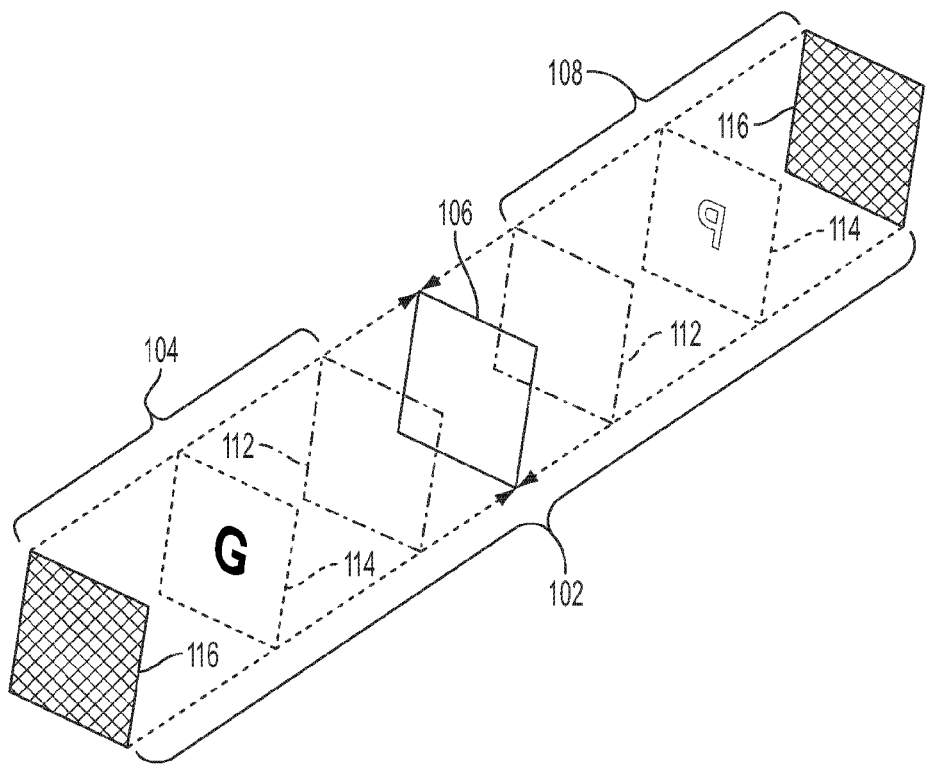
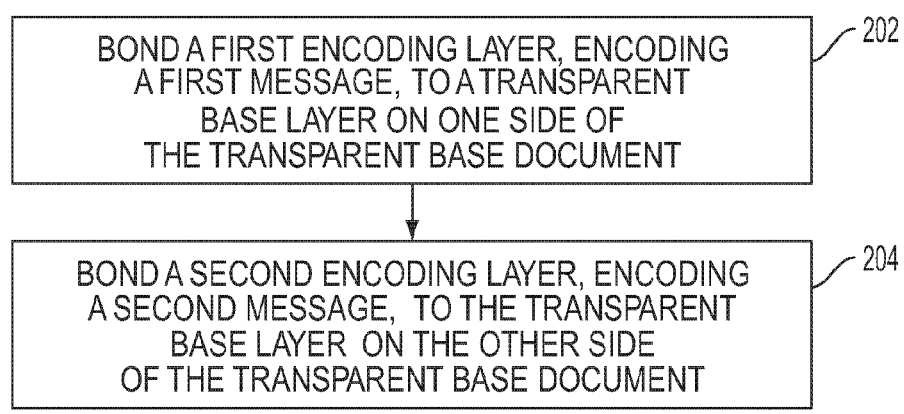
FIG. 2

FIG. 6
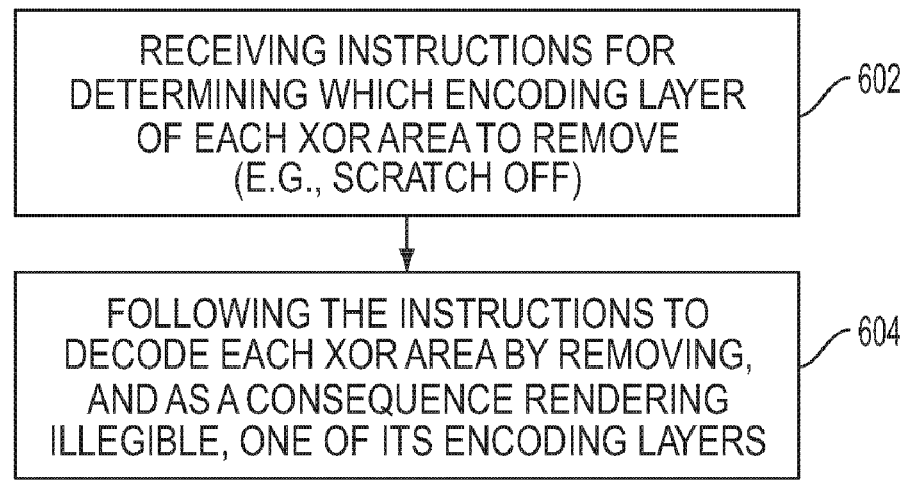
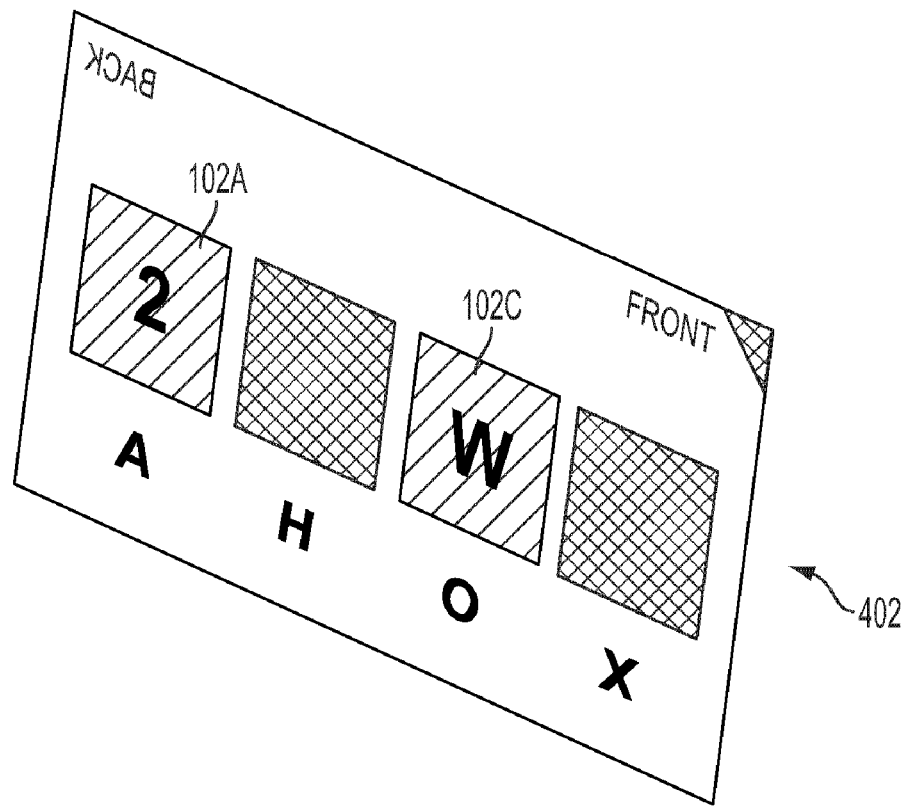
FIG. 7

FIG. 8
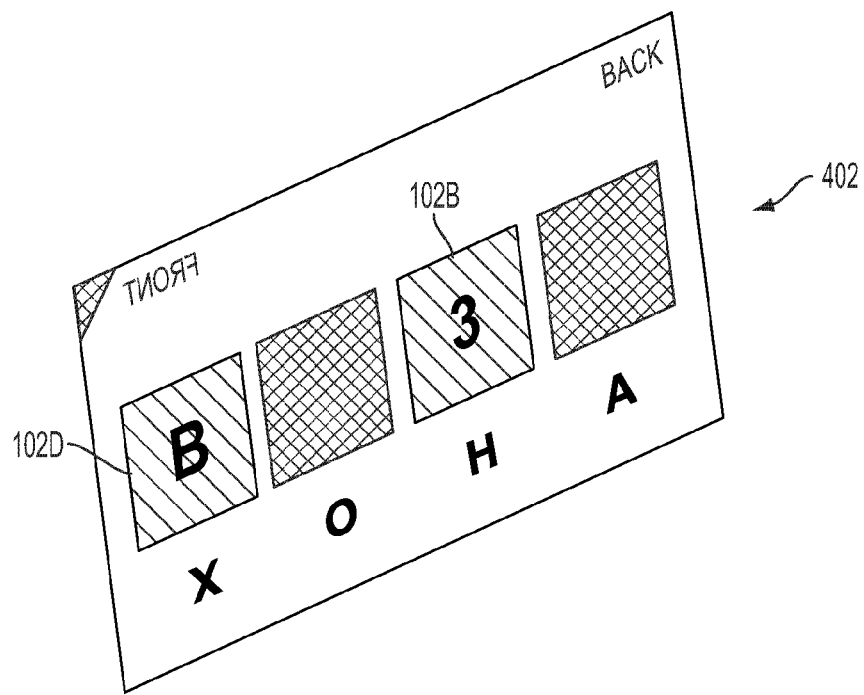
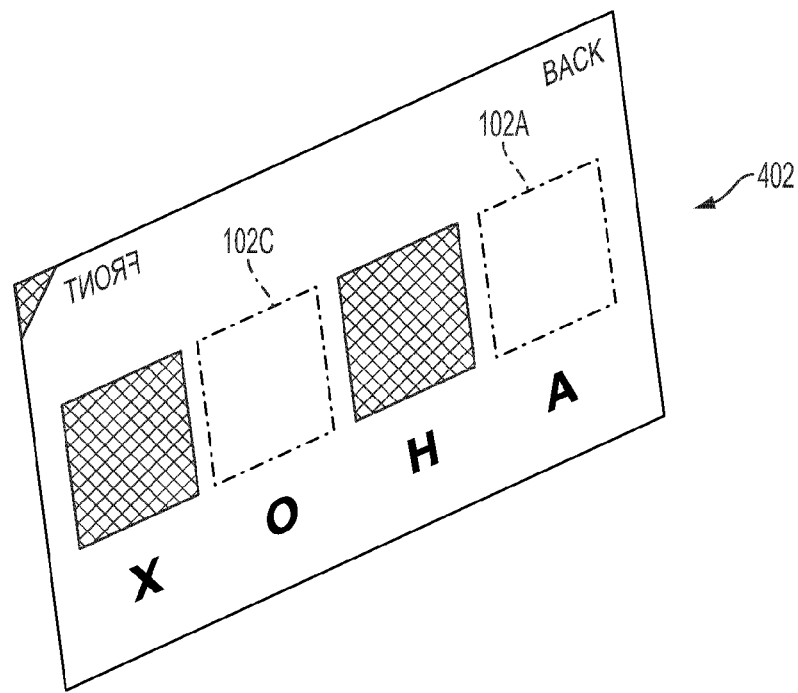
FIG. 9

XOR ENCODED DOCUMENT FOR SECURE MESSAGE EXCHANGE

CROSS REFERENCE TO RELATED APPLICATION

Cross-reference is made to U.S. patent application Ser. No. 11/276,055 filed concurrently herewith and entitled "Physical Token For Supporting Verification Of Human Presence In An Online Environment", which is assigned to the same assignee as the present invention and incorporated herein by reference.

BACKGROUND AND SUMMARY

The following relates generally to methods, apparatus and articles of manufacture therefor, for securely exchanging a message between two parties.

Generally in various online e-commerce applications, cryptography offers solutions for enabling secure communications between web servers and web clients. However, such cryptographic solutions require the assistance of a computer to operate. Consequently, individuals who are unwilling or unable to use a computer do not have access to this form of secure communication.

In addition, in online applications, such as gaming or account creation, online tests are increasingly used for discerning a human operator versus an automated operator (otherwise known as a "bot" or automated player agent). Such tests are known in the art as CAPTCHA (Completely Automated Public Turing Test to Tell Computers and Humans Apart) tests, which may be defeated in one form through relay attacks in which automated agents direct digital CAPTCHA tests that require human evaluation to a user that is human to solve the test. More background on the use of CAPTCHA tests and their limitations is disclosed by Philippe Golle and Nicolas Ducheneaut, in "Preventing Bots from Playing Online Games", published in the ACM Computers in Entertainment, Vol. 3, July 2005, which is incorporated herein by reference.

Accordingly, there continues to be a need for alternate solutions for both problems (i.e., cryptographic solutions for individuals with no online access and test for discerning human versus automated operators in an online environment). Such alternate solutions would advantageously provide a mechanism for allowing two parties communicating using either an off-line or an on-line environment to share a secret message, whether that message is for the purpose of delivering a personal identification number or providing proof of the existence of a human in an online-environment.

In accordance with the various embodiments disclosed herein, an exclusive or (XOR) encoded document is disclosed that is produced with hidden messages embedded on both sides of the document. A property of the XOR encoded document is that a message in an area on one side of the document cannot be revealed without rendering the message in that mirror area on the other side illegible. That is, the process of unmasking one message renders the other illegible. In one application, the XOR encoded document encodes a PIN (personal identification number) that is shared between a financial institution and its customer.

In accordance with the various embodiments disclosed herein, there is provided a method and article of manufacture therefor, that includes: a transparent base layer with a first side and a second side; a first encoding layer bonded to the first side of the transparent base layer; and a second encoding layer bonded to the second side of the transparent base layer in a location opposite (or mirror to) the first encoding layer; wherein the transparent base layer and its bonded first and second encoding layers define an XOR message area in which: (a) the first encoding layer encodes a first message visible only from the second side of the transparent base layer and the second encoding layer encodes a second message visible only from the first side of the transparent base layer; (b) one of the first and the second encoded messages is revealed when one of the first and second encoding layers is removed from the transparent base layer; and (c) the other of the first and second encoded messages is rendered illegible after the one of the first and second encoding layers is removed from the transparent base layer.

In accordance with one aspect of the various embodiments disclosed herein, each encoding layer is made up of: a transparent barrier layer bonded to the transparent base layer; a message layer bonded to the transparent barrier layer; and an opaque layer bonded to the message layer.

BRIEF DESCRIPTION OF THE DRAWINGS

These and other aspects of the disclosure will become apparent from the following description read in conjunction with the accompanying drawings wherein the same reference numerals have been applied to like parts and in which:

FIG. 1 illustrates the elements defining an XOR message area in which a message is hidden on either side of the message area;

FIG. 2 is a flow diagram setting forth the steps for preparing the XOR message area shown in FIG. 1;

FIG. 6 sets forth an example series of steps for using the XOR encoded document shown in FIG. 4;

FIGS. 7 and 8 illustrate the decoded front side and the decoded backside, respectively, of the XOR encoded document shown in FIG. 4;

FIG. 9 illustrates the XOR encoded document shown in FIG. 4 when the message layers are removed from both its front side and its backside;

DETAILED DESCRIPTION

A. Definition of Terms

The terms defined below have the indicated meanings throughout this application, including the claims and the figures:

"Transparent" is used herein to mean a medium or a layer that has sufficient clarity for recognizing on one side of the medium or layer an encoding that appears on the other side of the medium or layer.

"Opaque" is used herein to mean a medium or layer that does not transmit light so that the medium or layer obscures an encoding that appears on the other side of the medium or layer.

"XOR" as used herein means an exclusive or function that is applied to an area of a two-sided document, which exclusive or function permits only one side of the area of the two-sided document to be revealed, but not both.

B. Elements Defining an XOR Message Area

FIG. 1 illustrates the elements defining an XOR message area 102 in which a message is hidden on either side. FIG. 2 is a flow diagram setting forth the steps for preparing the XOR message area 102 shown in FIG. 1. At 202 in FIG. 2, a first encoding layer 104 shown in FIG. 1, encoding a first message, is bonded to one side of a transparent base layer 106, made up of a clear plastic or similar material, such as a transparency. At 204, a second encoding layer 108, encoding a second message, is bonded to the other side of the transparent base layer 106 opposite the first encoding layer 104.

Figure 3:
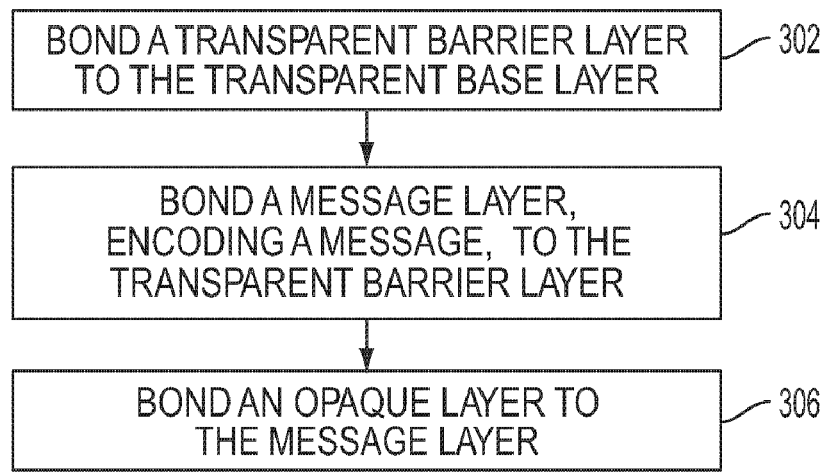
FIG. 3 is a flow diagram setting forth the steps for preparing the encoding layers shown in FIG. 1.

FIG. 3 is a flow diagram setting forth the steps for preparing the first encoding layer 104 and the second encoding layer 106 shown in FIG. 1. At 302, a transparent barrier layer 112 (which in one embodiment is approximately 0.1 mm thick) is bonded to the transparent base layer 106. At 304, a message layer 114 (which in one embodiment is approximately 0.1 mm) thick is bonded to the transparent barrier layer 112. In one embodiment, the message is recorded with an opaque non-metallic ink. The message (e.g., alphanumeric symbol) recorded with each message layer, in one embodiment, is printed as a mirror image, so that the message may be read on the opposite side through the transparent barrier layer 112 and transparent base layer 106. Finally at 306, an opaque layer 116 (which in one embodiment is approximately 0.2 mm thick) is bonded to the message layer 114. In one embodiment, the opaque layer 116 is a scratch-off material such as a thick layer of aluminum permeated latex.

The three encoding layers (transparent barrier layer) 112, (message layer) 114, and (opaque layer) 116 form a raised surface on the transparent base layer 106 that is sufficiently brittle such that scratching it off on one side effectively renders the message encoded on that side's message layer illegible (e.g., because in rubbing or scrapping the message off the transparent base layer, the encoding layer chips off into little pieces or a powdery residue) and the message on the other side visible through the transparent base layer 106.

The transparent barrier layer 112 in one embodiment is made up of a weakly cohesive transparent varnish (or glue) that acts as an adhesive to bond the message layer 114 and the opaque layer 116 together. The transparent barrier layer also serves to protect the transparent base layer 106 from residue that may transfer from the message layer 114.

In another embodiment, the message layer 114 is formed using a layer of carbon paper that is made up of a donor layer which includes a plurality of microcapsules containing an undeveloped dye that is bonded to the transparent barrier layer 106 (or alternatively the opaque layer 116). In addition, the carbon paper is made up of a receiving layer which includes a dye developer that is in contact with the donor layer on one side and bonded to the opaque layer 116 (or alternatively the transparent barrier layer 106) on the other. At least some of the microcapsules are broken to develop dye that encodes the message in the message layer 114. Advantageously, the other microcapsules that are not broken to complete the encoding of the message, break when pressure is later applied to the encoding layer to remove the message on that side of the XOR message area to view the message on the other, thereby corrupting the earlier encoded message and rendering it illegible upon removal.

In yet another embodiment, transparent barrier layers 112 are formed that are no larger than their corresponding message layers 114. The size and shape of the opaque layers 116 are larger in shape and size compared with the shape and size of the message layer 114 to render attacks on the message layer 114 less successful. The success of attacks directed at uncovering a message in a message layer 114 by, for example, uncovering half of the message on each side is reduced by defining a small message area formed of a brittle material that breaks into small chips or a powder to render the message layer that is removed illegible.

C. Embodiments Using XOR Message Areas

Figure 4:
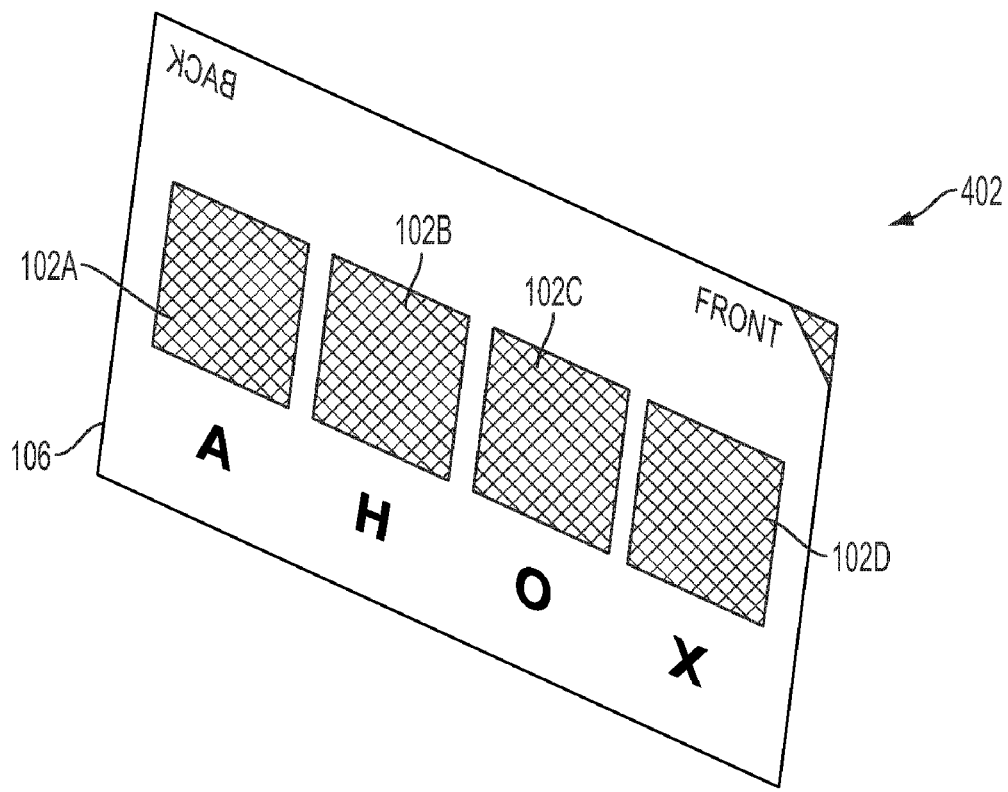
FIG. 4 illustrates an embodiment of an XOR encoded document having a plurality of XOR message areas.

FIG. 4 illustrates a first embodiment of an XOR encoded document 402 having a plurality of XOR message areas 102 arranged thereon. In FIG. 4, the XOR encoded document 402 is shown having four XOR message areas 102A, 102B, 102C, and 102D formed on a common transparent base layer 106. In alternate embodiments, one or more of the plurality of XOR message areas 102 may be formed on a transparent base layer 106 which is not transparent outside of the XOR message areas 102.

Figure 5:
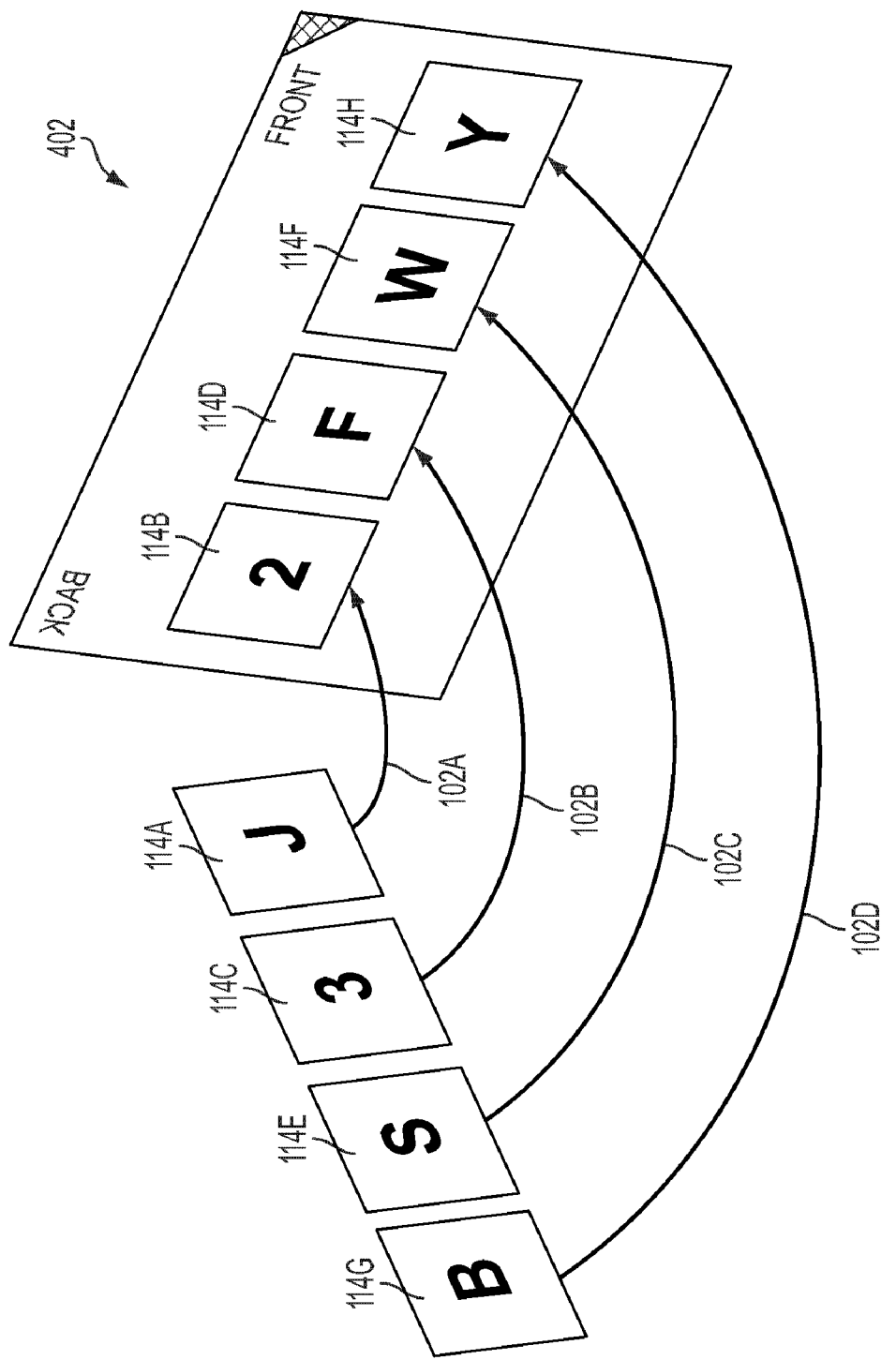
FIG. 5 illustrates the encodings of the message layers of the XOR message areas shown in FIG. 4.

The message layers 114 (shown in FIG. 1) of the XOR message areas 102 shown in FIG. 4 are encoded as shown in FIG. 5 with different alphanumeric symbols. As shown in FIG. 5, the message layers 114A and 114B of the XOR message area 102A encode symbols "J" and "2", respectively; the message layers 114C and 114D of the XOR message area 102B encode symbols "3" and "F", respectively; the message layers 114E and 114F of the XOR message area 102C encode symbols "S" and "W", respectively; and the message layers 114G and 114H of the XOR message area 102D encode symbols "B" and "Y", respectively.

FIG. 6 sets forth an example series of steps for using the XOR encoded document 402 shown in FIG. 4 with four XOR message areas defined thereon. At 602, instructions are received for determining which encoding layer of each XOR message area 102 to remove (e.g., scratch off). At 604, the instructions are followed to decode each XOR message area 102 by removing, and as a consequence rendering illegible, one of its encoding layers. This process is irreversible: once one message is unmasked its mirror on the opposite side of the document is not readily discernible as its parts are scratched or flaked away in pieces when the message that appears opposite it on the opposite side of the document is unmasked. Depending on the embodiment, the instructions received at 602 may direct or allow the recipient to select (or specify a combination of both types of instructions) which XOR area or areas of the XOR encoded document to unmask.

Figure 11:
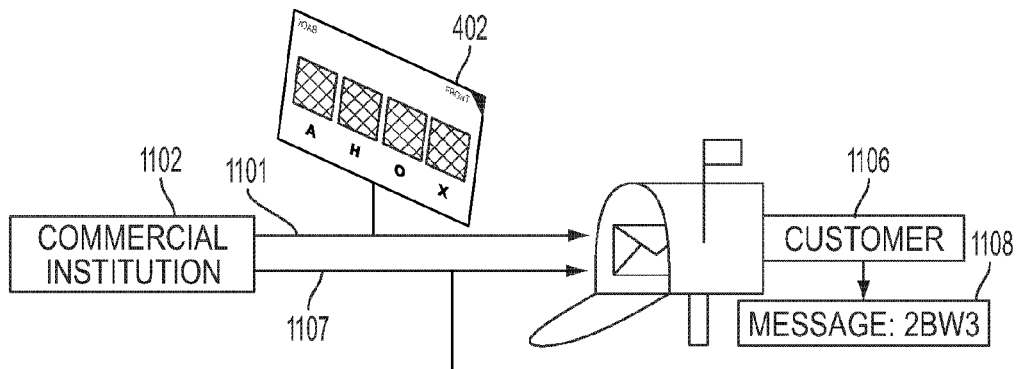
FIG. 11 illustrates an application of XOR message areas for secure message exchange.

For example, with the instructions set forth at 1104 in FIG. 11, the message "2BW3" at 1108 in FIG. 11 may be decoded from the XOR encoded document 402 (or "card") as shown in FIGS. 7 and 8. That is, removing or scratching off the encoding layer of the XOR message area 102 on the one side of the card (e.g., front), renders the message encoded in the encoding layer on the opposite side of the card (e.g., back) visible, and vice versa. As shown in FIG. 7, in removing the encoding layers of the XOR message areas 102A and 102C on the front of the card 402, reveals the message layer encoded in the encoding layers of the XOR message areas 102A and 102C on the back of the card 402. Also as shown in FIG. 8, in removing the encoding layers of the XOR message areas 102B and 102D on the back of the card 402, reveals the message layer encoded in the encoding layers of the XOR message areas 102B and 102D on the front of the card 402.

FIG. 9 illustrates a property of the document shown in FIG. 4. Namely, that after removing the encoding layers of the XOR message areas 102A and 102C on the front of the card 402 as shown in FIG. 7, and subsequently removing the encoding layers of the XOR message areas 102A and 102C on the back of the card 402 as shown in FIG. 9, the message layers 102A and 102C no longer exist rendering the card 402 transparent in those areas.

Figure 10:
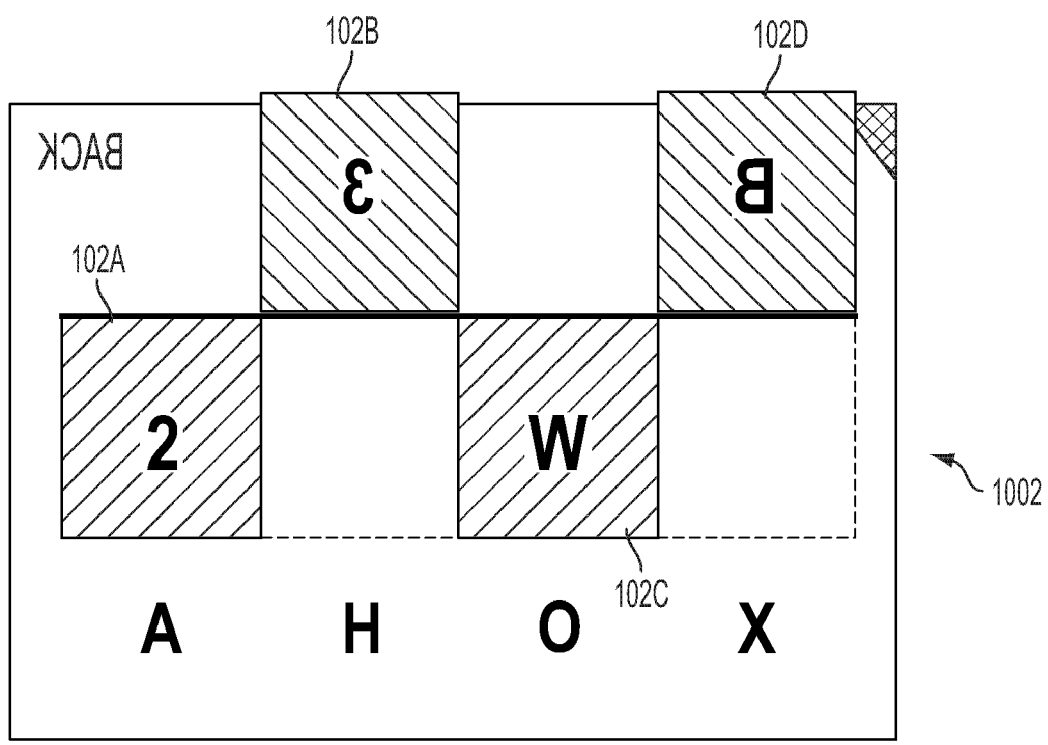
FIG. 10 illustrates an alternate embodiment of the XOR encoded document shown in FIG. 4.

FIG. 10 illustrates an alternate embodiment of the document shown in FIG. 4. In this alternate embodiment, each XOR message area 102 is a foldable tab with a crease that bends in one direction to reveal its backside. For example, with the instructions set forth at 1204 in FIG. 12, the message "2BW3" at 1208 in FIG. 12 may be used to decode the card or document 1002 shown in FIG. 10. As shown in FIG. 10, the front of the tabs forming the XOR message areas 102A and 102C were removed while the back of the tabs forming the XOR message areas 102B and 102D were flipped upwards. It will be appreciated that in the example shown in FIG. 10, the same encodings were used as shown in FIG. 4, and that depending on the side on which decoding instructions apply in the embodiment shown in FIG. 10, the message layer 114 on tabs must be flipped both horizontally and vertically to have the same orientation as the message layer on the tabs which are not flipped.

In the example shown in FIGS. 7 and 8, the two-sides of the XOR encoded document 402 are identified using a "front" and a "back" indicator. In an alternate embodiment, the two sides may be distinguished using one or a combination of different indicators, such as: color (e.g., one side is red and the other side is blue), pattern (e.g., one side is a grid lined and the other side is diagonal lined), and texture (e.g., one side is bumpy and the other side is flat).

D. Example Applications

FIG. 11 illustrates an application of XOR message areas (e.g., document 402 shown in FIG. 4) for secure message exchange. In the example shown in FIG. 11, there exist two parties, such as a commercial institution 1102 and a customer 1106, who would like to establish a joint secret key (e.g., a PIN or password) via a physical exchange of messages (e.g., by mailing the XOR encoded document 402 from one party to the other). In exchanging the joint secret key, initially in a first transmission 1101 the XOR encoded document 402 is mailed from the commercial institution 1102 to the customer 1106, and subsequently in a separate transmission 1107, instructions 1104 for decoding the XOR encoded document 402 are mailed from the commercial institution 1102 to the customer 1106. When in possession of both the XOR encoded document 402 and the instructions 1104 for decoding it, the message 1108 may be decoded.

In the event the XOR encoded document 402 is intercepted, the interceptor would have a $\frac{1}{2}^K$ (where K is the number of XOR encodings in the message) chance of decoding the encoded message correctly without also receiving the instructions 1104 for decoding the message. Interception of both the XOR encoded document 402 and the decoding instructions 1104 may be minimized by suspending the transmission of the decoding instructions 1104 until the transmission of the XOR encoded document 402 is verified to have occurred. This avoids a drawback with current methods for exchanging messages, such as a bank exchanging a message with a customer, where someone may intercept a letter with a PIN (personal identification number) and then re-seal it and forward it to its intended recipient, leaving the bank and the intended recipient unaware that their joint secret PIN was intercepted. In contrast, someone intercepting an XOR encoded document 402 may disrupt the communication between the bank and the intended recipient, but will likely not be able to learn the joint secret without showing some evidence of tampering with the XOR encoded document.

In another embodiment of the application illustrated in FIG. 11, the commercial institution is a bank that selects four message pairs at random. For example, the bank may choose the following message pairs: (2,8), (7,3), (2,1), and (0,9). The bank may encode each message pair on a separate sheet of an XOR encoded document, where the first digit of each message pair is encoded on each sheet using a red opaque layer and the second digit of each message pair is encoded on each sheet using a blue opaque layer.

Thus, in the preceding example with message pairs (2,8), (7,3), (2,1), and (0,9), sheet 1, 2, 3, and 4, contain the numbers 2, 7, 2, and 0 on the red side and 8, 3, 1, and 9 on the blue side, respectively. The bank, which numbers the four sheets in order to preserve their ordering, mails the set of ordered sheets to a bank customer. Upon receipt of the four ordered sheets, the bank customer selects at random one encoding layer from one of the two sides of each sheet to unmask. For example, if the customer chooses to unmasks the red side on sheets 1 and 2 and the blue side on sheets 3 and 4, the bank customer will unmask the numbers (or PIN) 2719. The bank customer subsequently reports to the bank through any open communication channel (e.g., phone, network, mail, etc.) which side of each sheet were unmasked to allow the bank to know what the secret PIN is between the bank and the customer without ever having to divulge the PIN. In an alternate embodiment, the recipient of the XOR encoded document (or bank customer) may be given the ability to select from any number of M XOR sheets to decode to define a secret of length N, which is less than M.

Figure 12:
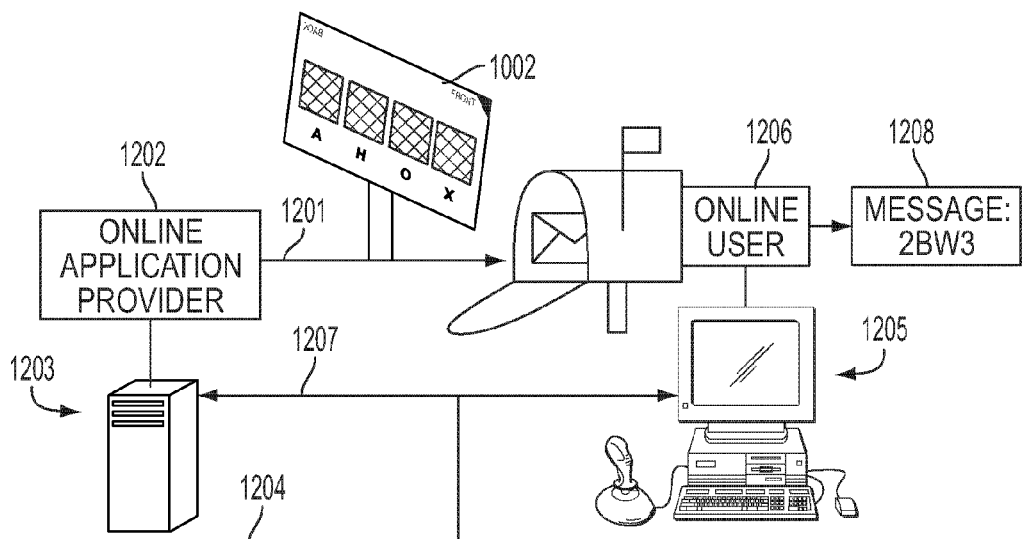
FIG. 12 illustrates an application of XOR message areas for restricting use of an online application to a human participant.

FIG. 12 illustrates another application of XOR message areas (e.g., document 402 shown in FIG. 4) for restricting use of an online application to a human participant. In the example shown in FIG. 12 when an online user 1206 signs up for (or re-initiates play of) an online application, the online application provider (such as a game) 1202 issues in a transmission 1201 the XOR encoded document 1002 (or an identified one of a plurality of XOR encoded documents) that is mailed from the online application provider 1202 to the online user 1206 (such as a player). To test whether the online user 1206 is human, the online user 1206 may be asked at a user's workstation 1205 by a server 1203 supporting the online application provider 1202 to reveal at 1207 the encoded message in the XOR encoded document 1202 after providing the decoding instructions 1204 to the online user 1206. Alternatively, the online user 1206 may be asked at a user's workstation 1205 by a server 1203 to specify a series of N decoded messages while indicating the side and location of the decoded message on the XOR encoded document 1002.

E. Miscellaneous

To recapitulate, there has been disclosed a two-sided XOR encoded document for establishing a joint secret between two parties. Encoded on the XOR encoded document are one or more XOR message areas on opposite sides of a transparent base layer. Each XOR message area hides from view on each side of the XOR encoded document a different message. Upon removing and rendering illegible a message on one side of an XOR message area, the message on the other side of the XOR message area becomes legible through the transparent base layer of the XOR message area.

Advantageously, the XOR encoded document may be used to facilitate secure message exchanges. As a further advantage, the XOR encoded document may be used in support of the detection of human presence in an online environment. Although the applications presented herein of the disclosed XOR encoded document concern commercial institutions and online applications, those skilled in the art will appreciate that it may be used in other applications, such as access control, or in industries, such as healthcare.

It will also be appreciated by those skilled in the art that the manner in which the XOR encoded document functions is similar to the manner in which quantum photons function when they yield one of two bits of information depending on the basis against which they are measured. Whereas photon measurements rely on the uncertainty principle of quantum physics, the disclosed XOR encoded document relies on assumptions about the physical properties of inks, varnishes and scratch off materials.

In the example instructions 1104 and 1204 shown in FIGS. 11 and 12, respectively, the instructions specify selection of the different XOR message areas 102A, 102B, 102C, and 102D of the XOR encoded document in FIG. 4 following a random order (e.g., 102A(front), 102D(back), 102C(front), and 102B(back)) where both the location and side vary. In alternate embodiments, the instructions 1104 and 1204 shown in FIGS. 11 and 12 may specify selection of the different XOR message areas 102A, 102B, 102C, and 102D of the XOR encoded document to follow an order arranged by location (e.g., 102A(front), 102B(back), 102C(front), and 102D(front)).

Those skilled in the art will recognize that general purpose computers may be used for implementing systems shown in FIGS. 11 and 12 and others described herein. Such general purpose computers would include hardware and software. The hardware would comprise, for example, memory (ROM, RAM, etc.), a processor (i.e., CPU), persistent storage (e.g., CD-ROM, hard drive, floppy drive, tape drive, etc.), user I/O, and network I/O. The user I/O may include a camera, a microphone, speakers, a keyboard, a pointing device (e.g., pointing stick, mouse, etc.), and the display. The network I/O may for example be coupled to a network such as the Internet. The software of the general purpose computers would include an operating system and application software providing the functions of the systems shown in FIGS. 11 and 12 and others described herein.

Further, those skilled in the art will recognize that the forgoing embodiments may be implemented as a machine (or system), process (or method), or article of manufacture by using standard programming and/or engineering techniques to produce programming software, firmware, hardware, or any combination thereof. It will be appreciated by those skilled in the art that the flow diagrams described in the specification are meant to provide an understanding of different possible embodiments. As such, alternative ordering of the steps, performing one or more steps in parallel, and/or performing additional or fewer steps may be done in alternative embodiments.

A machine embodying the embodiments may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the disclosure as set forth in the claims.

In addition, those skilled in the art will appreciate that example thicknesses of layer of embodiments of XOR message areas disclosed herein may vary, and that various other thickness of any of the different layers are contemplated and may therefore individually or together be less than or greater than the disclosed example thicknesses.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. An article of manufacture for secure message delivery, the article comprising:
   a transparent base layer with a first side and a second side;
   first encoding layer bonded to the first side of the transparent base layer; and
   a second encoding layer bonded to the second side of the transparent base layer in a location opposite the first encoding layer;
   wherein the transparent base layer and its bonded first and second encoding layers define an XOR message area in which:
   (a) the first encoding layer encodes a first message visible only from the second side of the transparent base layer and the second encoding layer encodes a second message visible only from the first side of the transparent base layer;
   (b) when the first encoding layer is removed from the transparent base layer, the first encoded message is rendered illegible and the second encoded message is revealed; and
   (c) when the second encoding layer is removed from the transparent base layer, the second encoded message is rendered illegible and the first encoded message is revealed.

2. The article of manufacture according to claim 1, wherein each encoding layer further comprises:
   a transparent barrier layer bonded to the transparent base layer;
   a message layer bonded to the transparent barrier layer; and
   an opaque layer bonded to the message layer.

3. The article of manufacture according to claim 2, wherein the transparent barrier layer comprises a layer of varnish.

4. The article of manufacture according to claim 2, wherein the message layer comprises a message encoded using ink.

5. The article of manufacture according to claim 2, wherein the opaque layer comprises a layer of latex.

6. The article of manufacture according to claim 2, further comprising a document having a plurality of XOR message areas arranged thereon.

7. The article of manufacture according to claim 6, wherein at least one XOR message area on the document comprises a tab that may be folded for viewing either the first encoding layer or the second encoding layer from one side of the document.

8. A method for secure message delivery, the method comprising:
   providing a transparent base layer with a first side and a second side;
   bonding a first encoding layer to the first side of the transparent base layer; and
   bonding a second encoding layer to the second side of the transparent base layer in a location opposite the first encoding layer;
   wherein the transparent base layer and its bonded first and second encoding layers define an XOR message area in which:
   (a) the first encoding layer encodes a first message visible only from the second side of the transparent base layer and the second encoding layer encodes a second message visible only from the first side of the transparent base layer;
   (b) when the first encoding layer is removed from the transparent base layer, the first encoded message is rendered illegible and the second encoded message is revealed; and (c) when the second encoding layer is removed from the transparent base layer, the second encoded message is rendered illegible and the first encoded message is revealed.

9. The method according to claim 8, wherein bonding each encoding layer further comprises:
   bonding a transparent barrier layer to the transparent base layer;
   bonding a message layer to the transparent barrier layer; and
   bonding an opaque layer to the message layer.

10. The method according to claim 9, further comprising forming the transparent barrier layer with a layer of varnish.

11. The method according to claim 9, further comprising forming the message layer with a message encoded using ink.

12. The method according to claim 9, further comprising forming the opaque layer with a layer of latex.

13. The method according to claim 9, further comprising forming a document having a plurality of XOR message areas arranged thereon.

14. The method according to claim 13, wherein said forming forms at least one XOR message area on the document with a tab that may be folded for viewing either the first encoding layer or the second encoding layer from one side of the document.

15. An article of manufacture for secure message delivery, the article comprising:
   a plurality of transparent base layers with a first side and a second side;
   a first encoding layer bonded to the first side of each transparent base layer; and
   a second encoding layer bonded to the second side of each transparent base layer;
   wherein each transparent base layer and its bonded first and second encoding layers define an XOR message area in which:
   (a) the first encoding layer encodes a first message visible only from the second side of the transparent base layer and the second encoding layer encodes a second message visible only from the first side of the transparent base layer;
   (b) when the first encoding layer is removed from the transparent base layer, the first encoded message is rendered illegible and the second encoded message is revealed; and
   (c) when the second encoding layer is removed from the transparent base layer, the second encoded message is rendered illegible and the first encoded message is revealed.

* * * * *